United States Patent
Fisher et al.

(10) Patent No.: US 7,014,218 B2
(45) Date of Patent: Mar. 21, 2006

(54) UNIVERSAL FITTING NIPPLE

(75) Inventors: William C. Fisher, Cuyahoga Falls, OH (US); Charles Lee Chapman, Strafford, MO (US); Kenneth Paul Girod, Highland Heights, OH (US); Kenneth L. Huebner, Vancouver, WA (US); Gregory Kreczko, Kalamazoo, MI (US); Maxim Levine, Laubach (DE); Thomas B. Lininger, Mantua, OH (US); Joshua D. Shircliff, Oak Creek, WI (US); Sung Taek We, Kyoungnam (KR)

(73) Assignee: Parker-Hannifin, Cleveland, OH (US)

( * ) Notice: Subject to any disclaimer, the term of this patent is extended or adjusted under 35 U.S.C. 154(b) by 0 days.

(21) Appl. No.: 10/823,482

(22) Filed: Apr. 13, 2004

(65) Prior Publication Data
US 2004/0251683 A1    Dec. 16, 2004

Related U.S. Application Data

(60) Provisional application No. 60/463,892, filed on Apr. 17, 2003.

(51) Int. Cl.
F16L 47/00    (2006.01)

(52) U.S. Cl. .................................... 285/256; 285/259

(58) Field of Classification Search ............... 285/241, 285/256, 259
See application file for complete search history.

(56) References Cited

U.S. PATENT DOCUMENTS

| 2,314,236 | A | * | 3/1943 | Mott ......................... 285/256 |
| 2,341,003 | A | * | 2/1944 | Watson ....................... 285/256 |
| 2,479,499 | A | * | 8/1949 | Le Clair ..................... 285/256 |
| 3,237,974 | A | * | 3/1966 | Press ......................... 285/222.4 |
| 4,106,526 | A |   | 8/1978 | Szentmihaly |
| 4,437,689 | A | * | 3/1984 | Goebel et al. ............... 285/246 |
| 4,498,691 | A |   | 2/1985 | Cooke |
| 4,684,157 | A |   | 8/1987 | Smith |
| 4,758,029 | A | * | 7/1988 | Davis ......................... 285/253 |
| 5,031,301 | A |   | 7/1991 | Oetiker |
| 5,267,758 | A |   | 12/1993 | Shah et al. |
| 5,317,799 | A |   | 6/1994 | Chapman et al. |
| 6,186,559 | B1 | * | 2/2001 | Fisher et al. ................ 285/256 |
| 6,439,617 | B1 | * | 8/2002 | Boer et al. .................. 285/256 |
| 6,443,500 | B1 | * | 9/2002 | Inoue et al. ................. 285/307 |
| 6,491,325 | B1 | * | 12/2002 | Boche ......................... 285/256 |

FOREIGN PATENT DOCUMENTS

| GB | 540701 | 10/1941 |
| GB | 885594 | 12/1961 |
| JP | 405001793 A | 1/1993 |

* cited by examiner

Primary Examiner—David Bochna
(74) Attorney, Agent, or Firm—Daniel J Whitman; Joseph J. Pophal

(57) ABSTRACT

A permanently attachable hose coupling for a pressurized conduit end having a generally tubular nipple and a generally cylindrical shell permanently attached to the nipple and generally surrounding the conduit end. The nipple has a longitudinal axis, first and second ends, a series of circumferential grooves located between the first and the second ends, a longitudinal through bore, and an insert portion adjacent the plurality of grooves for insertion in the conduit. Each of the series of circumferential grooves fixedly receive at least one of an inside surface, an end surface and an outside surface of the generally cylindrical shell and each of the grooves has a generally flat base portion parallel to the longitudinal axis, a first substantially vertically oriented sidewall adjacent the generally flat base portion and a second substantially vertically oriented sidewall.

27 Claims, 13 Drawing Sheets

UNIVERSAL FITTING NIPPLE

CROSS-REFERENCE TO RELATED CASES

The present application claims the benefit of the filing date of U.S. Provisional Application Ser. No. 60/463,892; filed Apr. 17, 2003, the disclosure of which is expressly incorporated herein by reference.

FIELD OF THE INVENTION

The present invention relates to a coupling for connection with a pressurized hose, and more particularly to the coupling nipple component and its universal design that enables it to connect with multiple styles of coupling shells.

BACKGROUND OF THE INVENTION

Fittings are used as connectors in order to link fluid conductors with each other. Fittings generally include a tubular element, or nipple having two ends. The first nipple end has an outer surface designed to connect with a further connector. This connector can be a stand-alone connector or can be part of a port, such as a manifold. The second nipple end has an outer surface which fixedly retains a tubular shell that circumferentially surrounds this end.

The second end of the nipple has an end portion that is adapted to be inserted into a conduit. The surrounding shell, which is attached to the second end of the nipple, surrounds the conduit. The conduit, or course, is the fluid conductor that is used to transfer fluid from one location to another. Typically, this conduit is flexible so that the fluid can be transferred in multiple directions or angulations without the awkward bending of a rigid pipe. The construction of the conduit is dependent on the application. For example, a conduit used for a high-pressure application will be thicker than that for a low-pressure application. As another example, a conduit used for water application will have different material that one used for fuel. In order to attach the conduit to the fitting, the shell is inwardly deformed so that the intermediate conduit portion is compressed between the shell and the nipple.

Shells can be fixedly attached to the nipple by several methods. As is well known in the art, the inner axial end of the shell can be inwardly deformed, or crimped, onto the nipple so that it is compressively attached. An example of such an attachment is shown in U.S. Pat. No. 5,031,301 to Oetiker. Other methods include radially compressing an inwardly directed shoulder of the shell into an annular groove in the nipple. An example of such an attachment is shown in U.S. Pat. No. 4,498,691 to Cooke. Another method of affixing the shell to the nipple includes axially compressing an inwardly directed shoulder of the shell between two radially outwardly extending protuberant surfaces, such as annularly formed beads. An example of such an attachment is shown in U.S. Pat. No. 3,924,883 to Frank. The attachment methods differ depending on the style of the mating conduit. For each of these attachment methods, the nipple outer profile is specifically designed for receiving one style of shell. That is, the nipple and shell are designed to only mate with each other. If a fabricator of a connector is intending to assemble the connector with multiple conduit styles, then the fabricator has to stock all styles of both the nipple and the shell. Due to the multitude of conduit styles, the manufacturer of the connector has to produce all styles of both the nipple and the shell. It is a disadvantage for a fabricator to have to stock a variety of nipple and shell styles. The fabricator would prefer to stock only one style nipple that is compatible with the various shell styles. It is also disadvantageous for the manufacturer to produce a variety of nipple and shell styles. The manufacturer would prefer to make only one style nipple that is compatible with all shell styles.

As previously mentioned, the conduit design is dependent on a variety of factors, one of which is the pressure of the application. A conduit intended for a high-pressure application will be thicker than that for a low-pressure application. The inner diameter of both conduits is the same but the outer diameter will change. Since the inner diameter remains the same, the fitting nipple also is the same for both applications. Since the outer diameter changes, the size of the shell has to change. This presents a disadvantage as to the number of parts required for a line of conduit sizes since these conduits require the same size nipple but different sized shells.

SUMMARY OF THE INVENTION

The present invention provides improvements in hose couplings, used as connectors with pressurized conduit, that overcome one or more of the aforesaid obstacles met with prior art couplings.

According to one feature of the present invention, a nipple, which is a component of the hose coupling, has an outer surface with at least two spaced circumferential grooves for fixedly receiving a generally cylindrical shell, which is another component of the hose coupling, wherein at least one of the circumferential grooves is in abutting contact with one of the inside surfaces of the shell, the end surface of the shell and the outside surface of the shell.

According to another feature of the noted coupling, the noted nipple has a plurality of spaced circumferential grooves for fixedly receiving an end portion of the shell, wherein at least one of the grooves has a diameter less than the adjacent grooves and the end portion is fixedly received in at least one of the grooves.

According to yet another feature of the noted coupling, the nipple has a plurality of spaced circumferential grooves for fixedly receiving a generally cylindrical shell, which can be of varying diameters, in one of the grooves which have successive increasing diameters relative to the shell.

Another feature has the noted coupling having a generally tubular nipple with a permanently attached cylindrical shell that generally surrounds and affixes to the conduit. The nipple has a longitudinal axis, a first and second end, a series of circumferential grooves located between the first and second ends, a longitudinal through bore and an insert portion adjacent the plurality of grooves for insertion into the conduit. Each of the series of circumferential grooves can fixedly receive at least one of an inside surface, an end surface and an outside surface of the generally cylindrical shell. Each of the series of grooves has a generally flat base portion parallel to the longitudinal axis, a first substantially vertically oriented sidewall adjacent the generally flat base portion and a second substantially vertically oriented sidewall positioned adjacent the generally flat base portion on the side opposite the first sidewall and having a maximum radial extent less than the first sidewall. Yet another feature has the generally cylindrical shell having a first end with an inwardly directed portion having an annular surface in an abutting relationship with one of the at least two circumferential grooves for the permanent attachment. Still another feature has the inwardly directed portion located at the longitudinal inner end of the shell. Another feature has the inwardly directed portion located on the inside surface of the shell. Another feature has the shell having a first end and a second end, wherein the first end has a turned-in-portion generally directed towards the second end. Still yet another feature has the outer surface of the noted turned-in portion in affixed abutment with the first sidewall. A further feature has the inside surface of the noted shell fixedly abutting the first and the second sidewalls.

A further feature of the present invention has a generally tubular nipple having a longitudinal axis, a first end, a second end, an outer surface with a plurality of circumferential grooves located between the first and the second ends for fixedly receiving a generally cylindrical shell, and a bore extending from the first end to the second end. The noted plurality of circumferential grooves are dimensioned for fixedly receiving at least one of an inside surface, an end surface and an outside surface of the generally cylindrical shell. The plurality of grooves are comprised of a first groove, a second groove and a third groove. The first groove has a generally flat base portion parallel with the longitudinal axis, a first generally vertically oriented sidewall and a second generally vertically oriented sidewall having a maximum radial extent less than the first sidewall. The second groove is adjacent the first groove and has a generally flat base portion parallel with the longitudinal axis, a diameter less than the first groove base portion, a first generally vertically oriented sidewall having a maximum radial extent substantially equal to the first groove second sidewall, and a second generally vertically oriented sidewall having a maximum radial extent less than the second groove first sidewall. The third groove is adjacent the second groove, has a generally flat base portion parallel with the longitudinal axis, a diameter less than the second groove base portion, a first generally vertically oriented sidewall having a maximum radial extent substantially equal to the second groove second sidewall and a second generally vertically oriented sidewall having a maximum radial extent greater than the third groove first sidewall. A further feature of the noted nipple has the first groove second sidewall and the second groove second sidewall with a contoured top portion. Still another feature of the noted nipple has the first groove second sidewall and the second groove second sidewall with an angled top portion. Still yet a further feature has the noted nipple having an insert portion, located between the third groove and the second end, with a plurality of spaced, circumferentially extending, frusto-conically shaped protrusions on the outer surface thereof. Another aspect of the noted nipple insert portion has one of the plurality of spaced protrusions positioned approximately equidistant between the third groove and the second end and having a maximum radial extent greater than that of each of the others of the plurality of protrusions. Still another aspect of the noted nipple has a series of surface disruptions along the circumference of each of the plurality of grooves. Yet another aspect of the noted nipple has the outer surface of the third groove second wall being threaded for attachment with the generally cylindrical shell.

Further features and advantages of the present invention will become apparent to those skilled in the art upon review of the following specification in conjunction with the accompanying drawings.

DETAILED DESCRIPTION OF THE PREFERRED EMBODIMENTS

Figure 4:
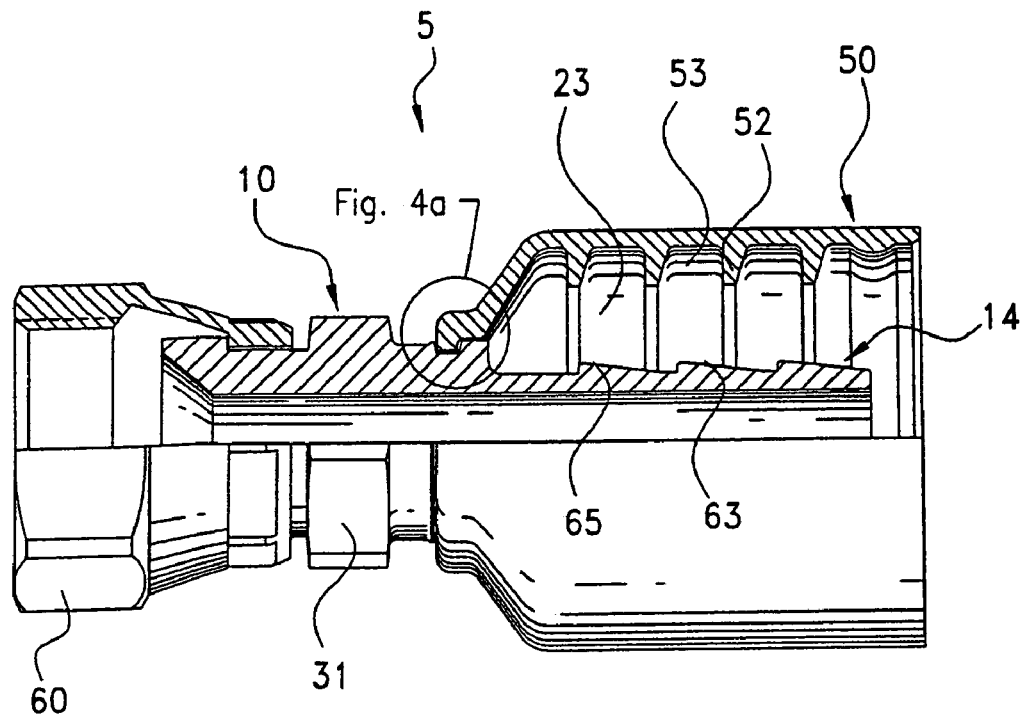
FIG. 4 is an elevational view, partially in section, of a fitting comprised of the present invention nipple with the attached nut and another form of an attached socket.
Figure 4A:
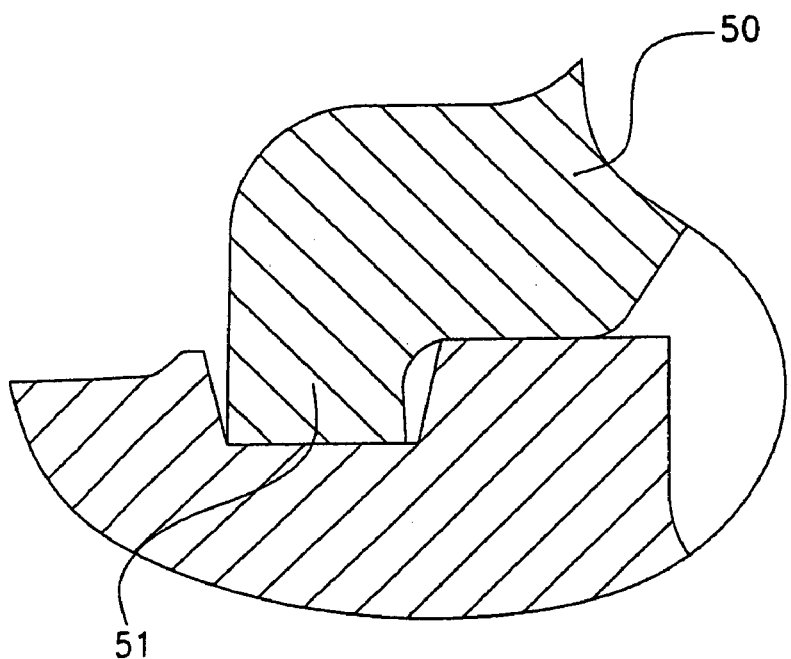
FIG. 4a is a magnified view of the section circled in FIG. 4 detailing the nipple-shell interface.

Referring initially to FIG. 4, the present invention takes the form of a metallic hose connector 5 that is used for permanent attachment to a conduit or flexible hose construction (not shown). Connector 5 consists of a round or cylindrical nipple or insert 10, an attached cylindrical or cup-shaped shell or socket 50 and an attached nut 60. An annular circumferential space 23, existing between nipple 10 and socket 50, is dimensioned for receiving the flexible hose. Nut 60 can be coupled with other connectors or assembled onto a port body or receiver (none shown).

Nipple 10 has an insertion end 14 with an outer surface profile consisting of a unique pattern of grooves, ridges and tapered steps or barbs 63, as well as a single raised, tapered barb 65, with corners and edges designed to seal against the hose inner diameter tube material and retain the hose from movement under hydraulic or pneumatic pressure or mechanical loading. Socket, or shell, 50 can have a plurality or series of spaced, internally directed projections or teeth 52 separated by internally machined or formed concentric or helical pitched grooves 53. Of course, a socket without teeth 52 could be used. In order to assemble the hose onto connector 5, the hose is placed into annular space 23 and socket 50 is inwardly compressed or deformed, such as by mechanical crimping or swaging. This compresses the hose materials between socket 50 and nipple 10. This compression of the hose materials not only seals the hose to connector 5 but also retains the hose within connector 5 while the hose-connector combination is under internal pressure and mechanical loading during use. The basic design concepts for permanently attached metallic hose connectors is well known in the art and is shown, for example, in prior art U.S. Pat. No. 3,413,020 to Johns.

Figure 1:
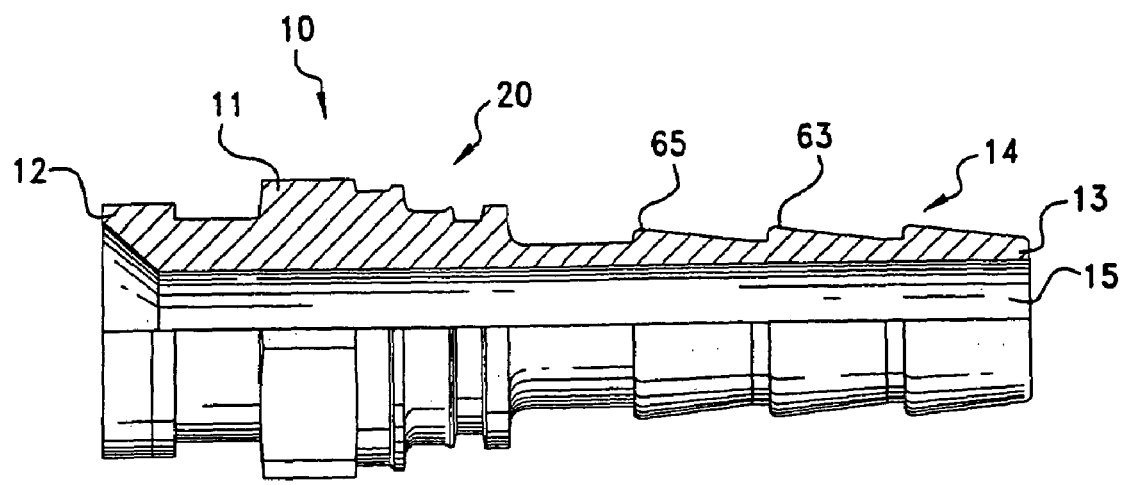
FIG. 1 is an elevational view of one embodiment of a fitting nipple, partially in section, in accordance with the present invention.
Figure 13:
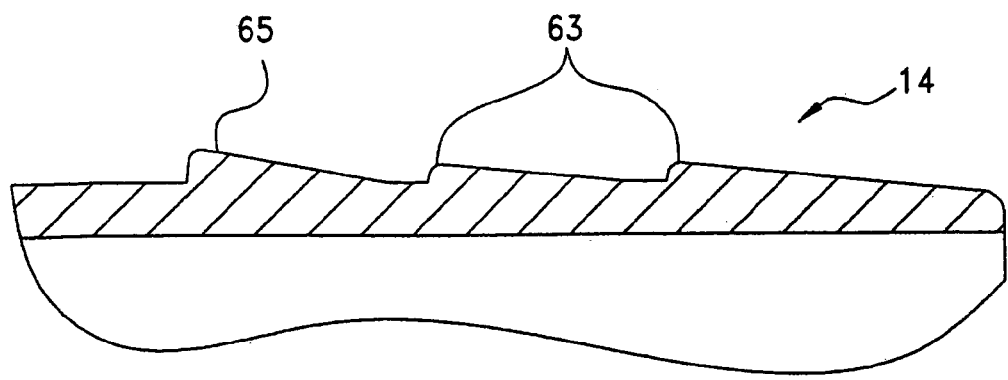
FIG. 13 is a close-up breakout view of the barbs on the nipple shown in FIG. 1.

Referring now to FIG. 1, nipple 10 includes a unique surface whose geometry can accommodate, seal and perform satisfactorily with a variety of flexible hose constructions. This variety includes but is not limited to metallic wire and filament yarn reinforced hose constructions containing thermoset rubbers, thermoplastics, thermoplastic elastomers and hybrid combinations employing all of these types of materials. Generally tubular nipple 10 also includes a body 11 having opposed end surfaces 12, 13 and a through bore 15. Referring to FIGS. 1 and 13, insertion end 14 features a single raised tapered surface or barb 65, having a greater outside diameter than barbs 63, which allows insertion end 14 to accommodate the wide variations found in hose bore diameter dimensions. Hoses made to different industry standard bore dimensions can all be accommodated by a single universal nipple 10 without causing excessive interference with some hose bores and likewise creating excessive looseness with larger bore dimensioned hoses.

Referring now to FIGS. 1, 4, 7, and 8, another novel feature of nipple 10 is the unique geometry of its shell attachment area 20. The annular profile of area 20 is universal since it is designed to accept, connect with and function with a wide variety of metallic compression shells, which have significantly wide variations in material composition, geometry, strength and intended performance. The ability of nipple 10 to accept and accommodate numerous compression shells permits nipple 10 to be essentially universal and capable of being used with many material constructions and pressure ranges of flexible reinforced hose. As is well known in the art, the design of the hose construction reflects its intended working pressure, temperature and fluid media. This commonality of nipple component 10 by hose size offers reduced cost and reduced inventory compared with other prior art coupling designs. Single insert nipple 10, matched with multiple specialized compression shells 50, is more versatile and cost effective compared with prior art shell collar insert designs.

Nipple 10 shell attachment area 20 consists of a multi-faceted, concentrically diametered outer profile where two or more diameters have specific steps, ledges, or lands 26, 28, and 32. As illustrated, FIGS. 7 and 8 detail almost identical profiles except that the profile of FIG. 8 has an extra step 32 which enables this nipple to accommodate a wider range of shell diameters. Lands 26, 28 and 32 help to locate and position compression shell 50 on nipple 10 prior to permanent attachment thereon. The locking mechanism and the resulting strength of retention for each shell 50 is based on the material properties, thickness and geometric features incorporated into each shell design. A plurality of raised and radius edges or ridges 25, 27, and 29 are positioned adjacent transitioning steps, ledges, or lands 26, 28 and 32, respectively. These ridges have a predetermined geometry allowing shell 50 to properly locate into its step/land and preventing the crimped compression shell 50 from moving axially.

Shell attachment area 20 can be produced on fitting nipple 10 using typical metal forming processes such as turning, forming, and rolling techniques. Attachment area 20 can also be produced by attaching previously formed components to a round nipple profile by threading, brazing, press fitting, welding or by internal expansion, such as via swaging, of the nipple tube inside bore into the bore of a separate component containing the stepped profile.

Figure 2:
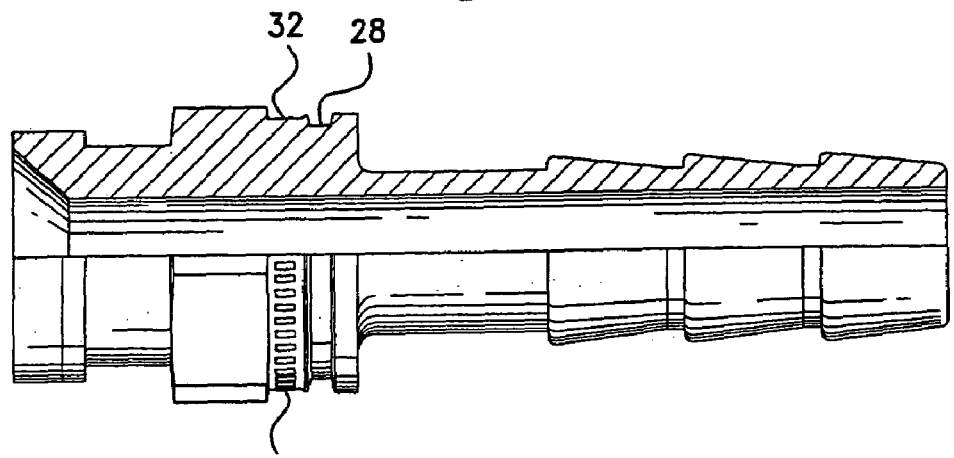
FIG. 2 is an elevational view, partially in section, of a further embodiment of the fitting nipple according to the present invention.
Figure 3:
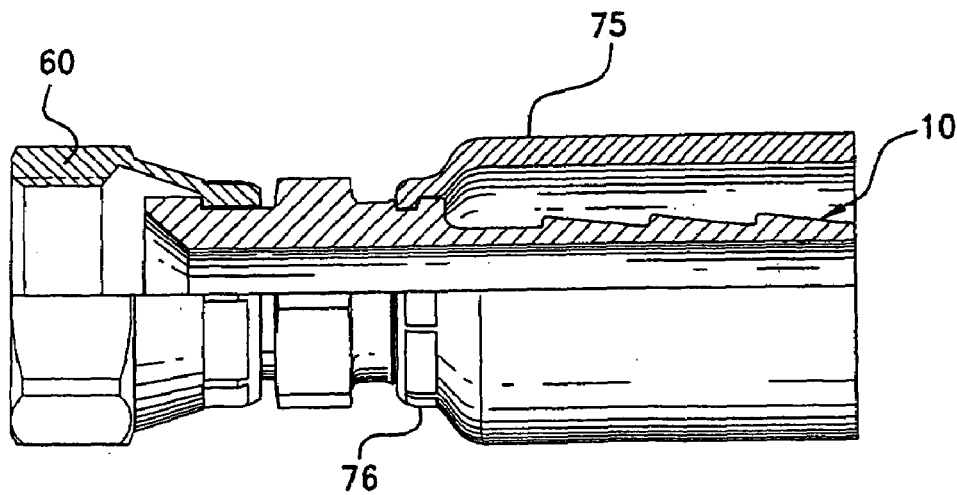
FIG. 3 is an elevational view, partially in section, of a fitting comprised of the present invention nipple with an attached nut and one form of an attached socket.

Referring to FIG. 2, nipple 10 can have an added feature that aids in the retention of shell 50. The surface of each shell receiving step 26, 28, 32 (FIG. 8) can contain one or more circumferential surface disruptions or knurls 17 (only one shown) which aid in the retention of and in the resistance to torque, or twisting, loosening of the attached compression shell 50. Such circumferential disruptions can be formed by well-known machining processes such as knurling, broaching, spline cutting and key slotting. Knurls 17 can also be formed by other processes such as welding, adhesive bonding, shot peening and metal etching. In order to hermetically seal fitting nipple 10 to shell 50, for the prevention of minute fluid escape or ingression, sealing materials such as gaskets, adhesives, and sealing methods such as brazing, soldering and welding can also be employed in this area.

Figure 16:
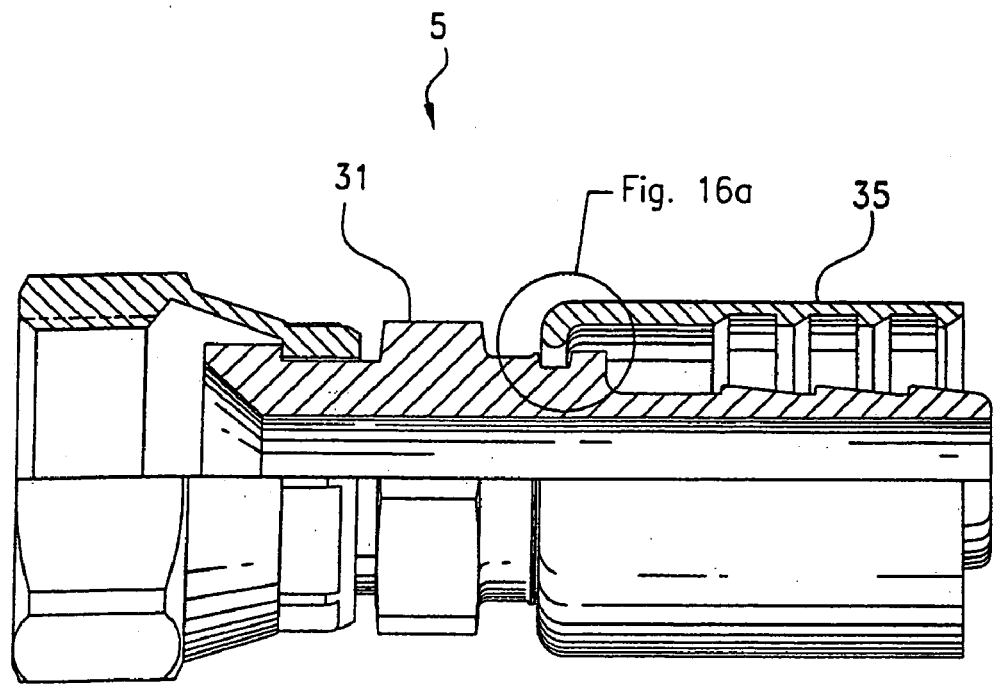
FIG. 16 is an elevational view of a fitting, partially in section, in accordance with another embodiment of the present invention prior to the permanent attachment of the socket onto the nipple.
Figure 16A:
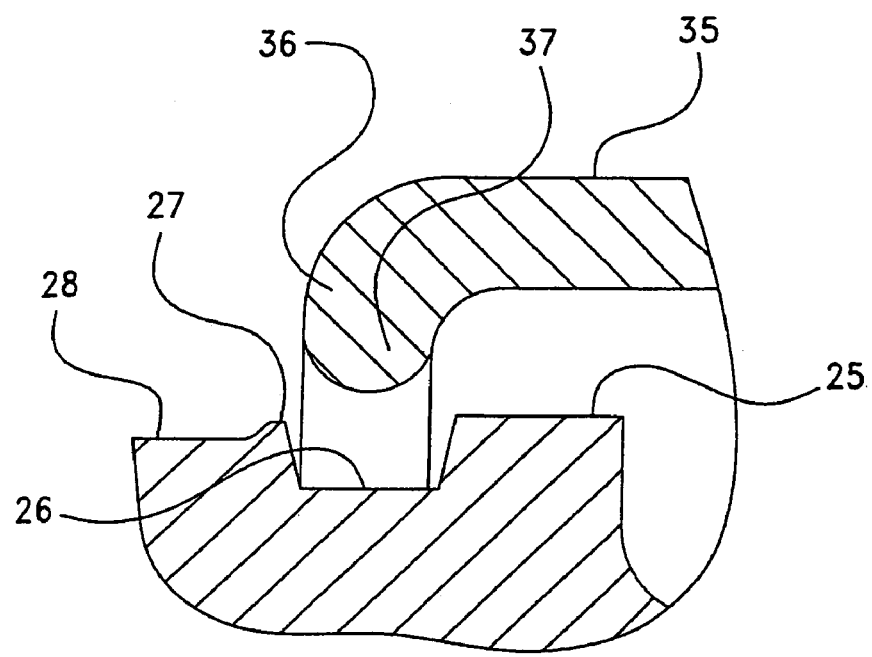
FIG. 16a is an enlarged view of the socket receiving area of the nipple shown in FIG. 16.
Figure 17:
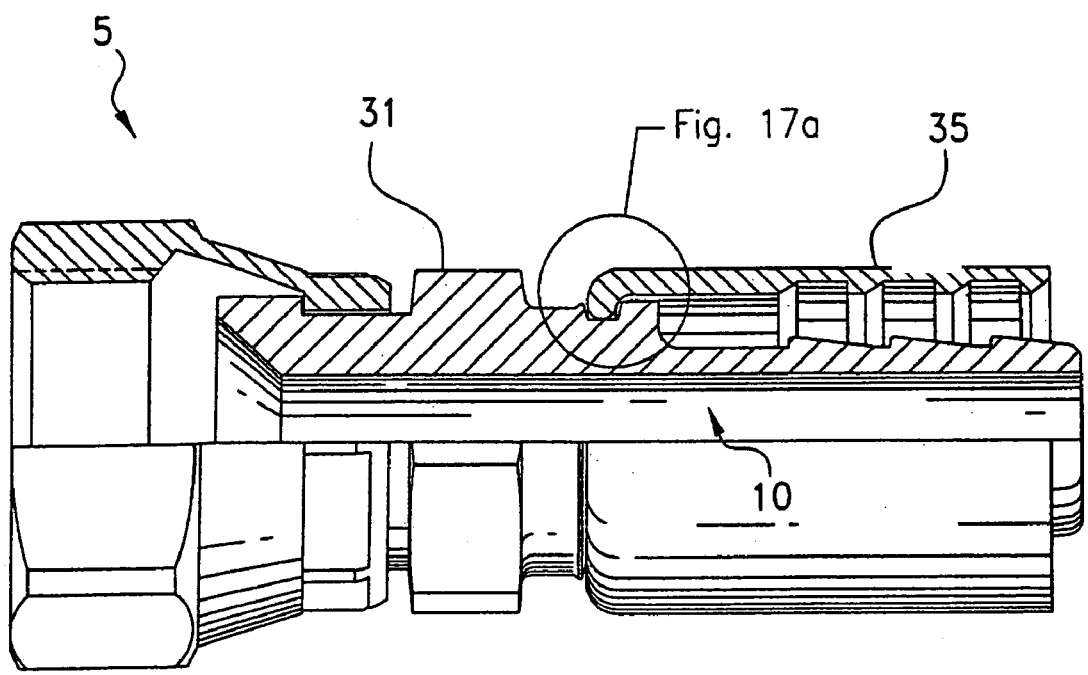
FIG. 17 is an elevational view of the fitting, partially in section, shown in FIG. 16 with the shell permanently attached to the nipple.
Figure 17A:
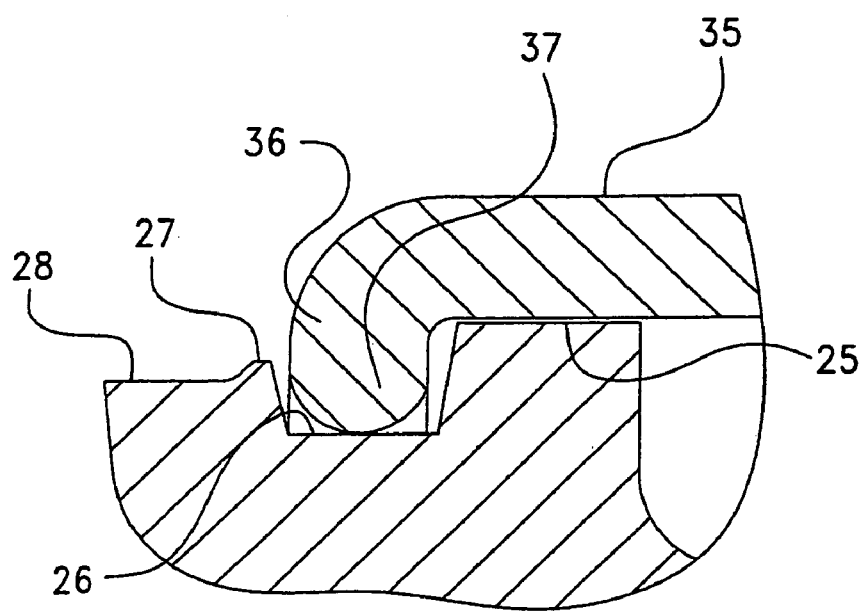
FIG. 17a is an enlarged view of the nipple-socket interface of the fitting shown in FIG. 17.

Various attachment methods for the compression shells can be used in combination with universal nipple 10. These combinations are illustrated in FIGS. 3–5, 9–12 and 16–19. Referring initially to FIGS. 16, 16a, 17 and 17a, nipple 10 can accommodate an essentially straight shell 35 by receiving the end of straight shell 35 within receiving step 26. FIG. 16a details the shell receiving or attachment area 20 of nipple 10 prior to the inward compression of shell 35. FIG. 17a details the shell-nipple interface after shell 35 has been inwardly compressed. Shell 35 has an inwardly directed end portion 36 with an end surface or lip 37 that occupies step 26 when shell 35 is inwardly crimped as shown in FIG. 17a. Shell 35 is prevented from moving axially by spaced shell receiving ridges 25 and 27. When operatively compressed between shell 35 and nipple 10, the hose can transfer axial stresses upon shell 35 (e.g., when the hose is axially pulled). The snug compressive placement of shell lip 37 between ridges 25 and 27 prevents any axial movement of shell 35.

It should be noted that if connector 5 were to interface with a hose of a greater outer diameter, shell 35 would be dimensioned with a complementary greater inner diameter. In this case, inwardly directed lip 37 would be received in receiving step 28 which has a greater diameter than step 26. Shell lip 37 would be axially restricted by ridge 27 and a formed hex or landing 31 on nipple 10. If an even larger inner diameter shell were needed, the nipple profile illustrated in FIG. 8 could be used wherein inwardly directed lip 37 would be received in receiving step 32. This will enable connector 5 to be mated with a thicker hose, i.e., one having a large outer diameter.

Figure 18:
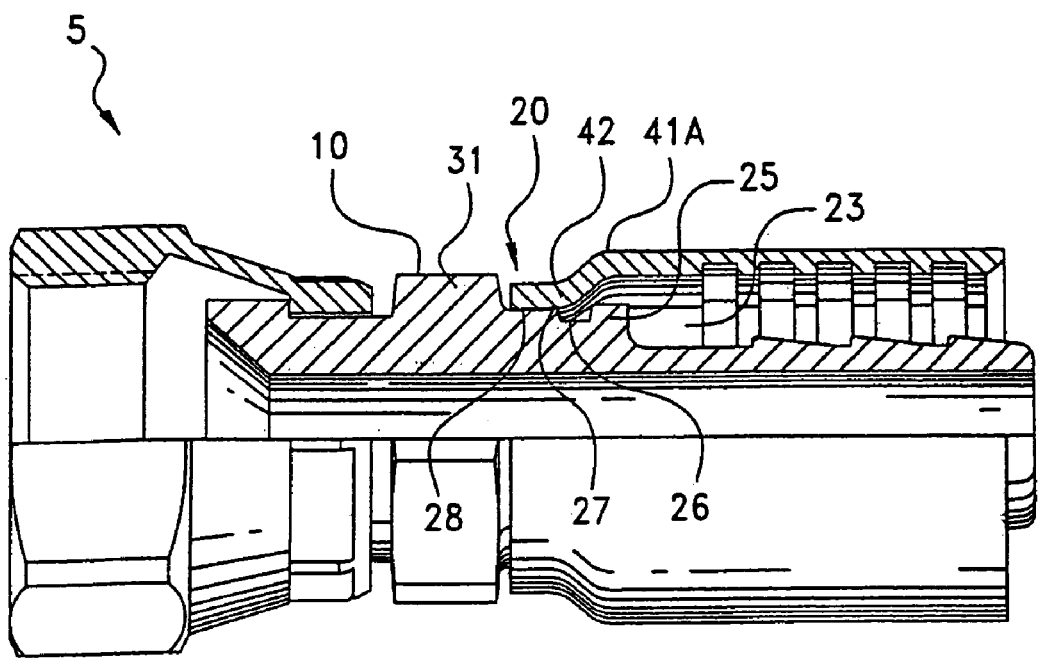
FIG. 18 is an elevational view of a fitting, partially in section, in accordance with yet another embodiment of the present invention.
Figure 19:
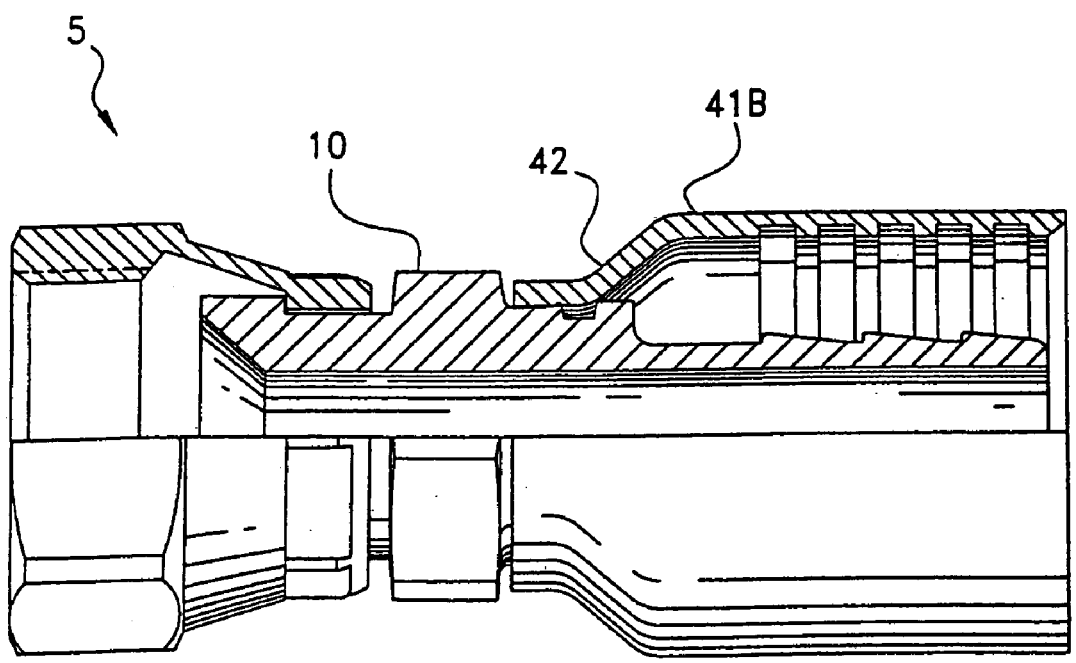
FIG. 19 is an elevational view of a fitting, partially in section, in accordance with a further embodiment of the present invention.

Another style of shell, i.e., a bottlenosed or tapered shell 41a–b, that can be assembled onto universal nipple 10 is shown in FIGS. 18 and 19. Bottlenosed shell profiles 41a–b permit both large diameter and small diameter shells to be easily attached to one universal nipple 10. Shells 41a–b can be small or very large in diameter with respect to the diameter of nipple 10 and its associated shell locking step, such as 26, 28 and 32. As can be seen in FIGS. 18 and 19, shell 41a and 41b are not attached to nipple 10 in the same fashion as previously described. Unlike straight shell 35, that has the outer surface of inwardly directed lip 37 abutting shell receiving step 26 (shown in FIG. 17a), the inner surface of shell 41 abuts shell attachment area 20. Specifically, a bottlenosed or necked-down inner end portion 42 is inwardly compressed so that it deformably contacts receiving ridge 25, ridge 27 and shell receiving step 28. As a result, ridges 25 and 27 impinge and enter into the inner surface of bottlenosed portion 42 so that shell 41 is physically affixed to nipple 10 and cannot move axially. This mutual physical deformation attachment is different than that shown in FIG. 17a where lip end 37 of shell 35 is axially arrested between ridges 25 and 27 as well as being located within receiving step 26. Ridge 27 also prevents the axial misalignment of shell 41 during the fabrication of connector 5, specifically at the addition of a hose. During assembly, the hose is inserted into annular space 23 prior to the inward compression of shell 41. The hose may tightly fit within space 23 and may require the use of substantial axial force in order to be fully inserted. It is imperative that shell 41 not move axially with the hose as the hose travels into space 23 (or towards ridge 27). The abutment of the inside surface of bottlenosed portion 42 of shell 41 with ridge 27 prevents shell 41 from moving axially.

The connectors shown in FIGS. 18 and 19 both employ the same configuration of universal nipple 10, but are intended for two differing outer diameter hoses. As can be seen, the inner diameter of shell 41b in FIG. 19 is greater than the inner diameter of shell 41a in FIG. 18. This type of design ensures that only one component, i.e., shell 41, of connector 5 need be switched for the proper attachment of hoses having varying outer diameters.

Figure 8:
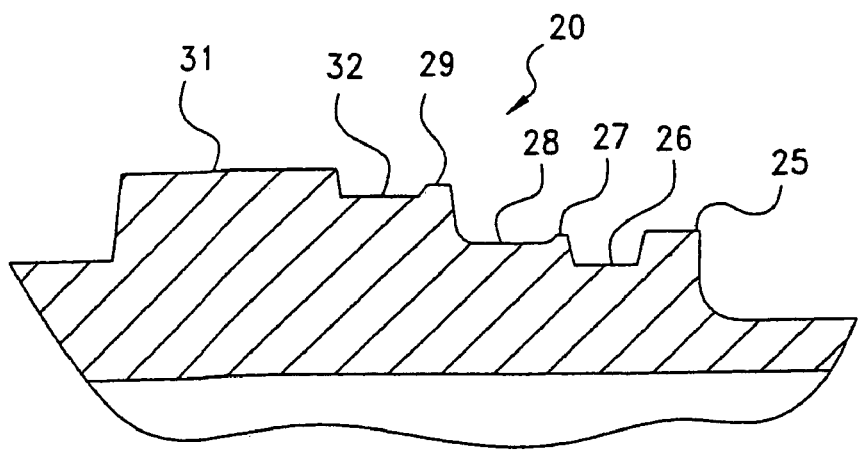
FIG. 8 is an enlarged view of the socket receiving area on the nipple shown in FIG. 1.

Referring back to FIGS. 3–5a, universal nipple 10 can accommodate any desired stamped, forged, pressed, roll formed or traditionally machined shells. Using one or more of locking steps 26, 28, 32 (as best shown in FIG. 8), even shells having a greater than usual end, or collar, wall thickness, as in FIG. 5, can be successfully attached and retained. As previously discussed, the retention strength of the shell is based on the combination of its material properties, thickness and geometric features. Thick wall shells offer added pressure resistance and mechanical strength. Compression shells containing an edge or lip (e.g., lip 51, shown in FIGS. 5 and 5a) which locates and locks into the smallest diameter step in the shell retention area offer greater resistance to axial forces under pressure and therefore permit the shell and nipple length to be shorter (as shown in FIG. 4) than is otherwise possible with tube style shells (as shown in FIG. 19). A reduced nipple length will decrease its material cost so it is desired to minimize the fitting length while ensuring that the hose is adequately retained and sealed.

Figure 5:
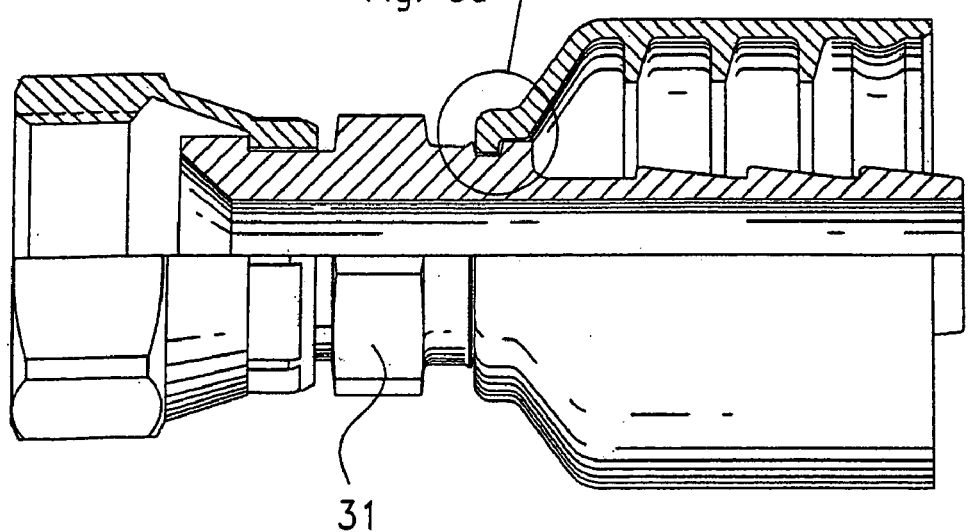
FIG. 5 is an elevational view, partially in section, of a fitting including another embodiment of the fitting nipple with an attached nut and another form of an attached socket.
Figure 5A:
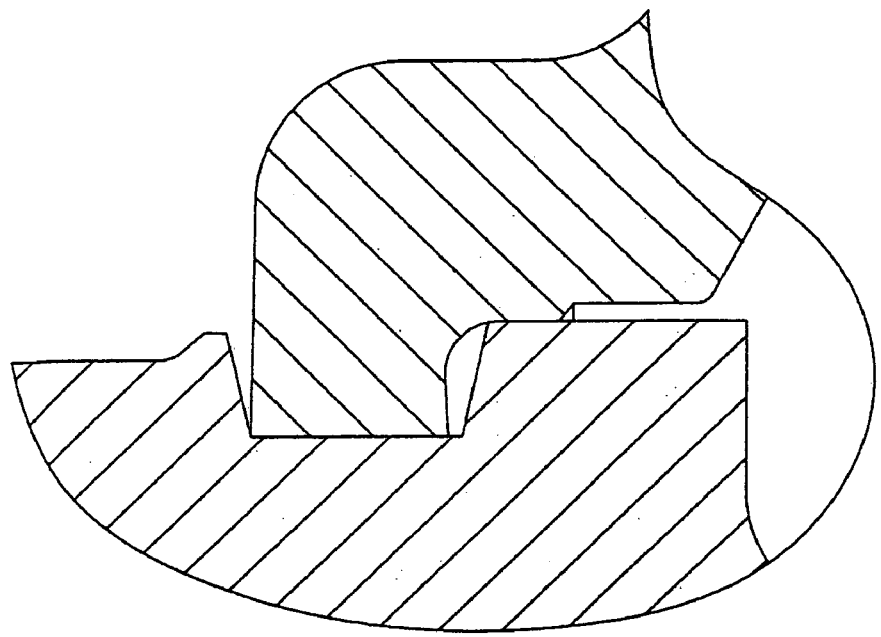
FIG. 5a is a magnified view of the circled portion in FIG. 5 detailing the nipple-socket interface.
Figure 6:
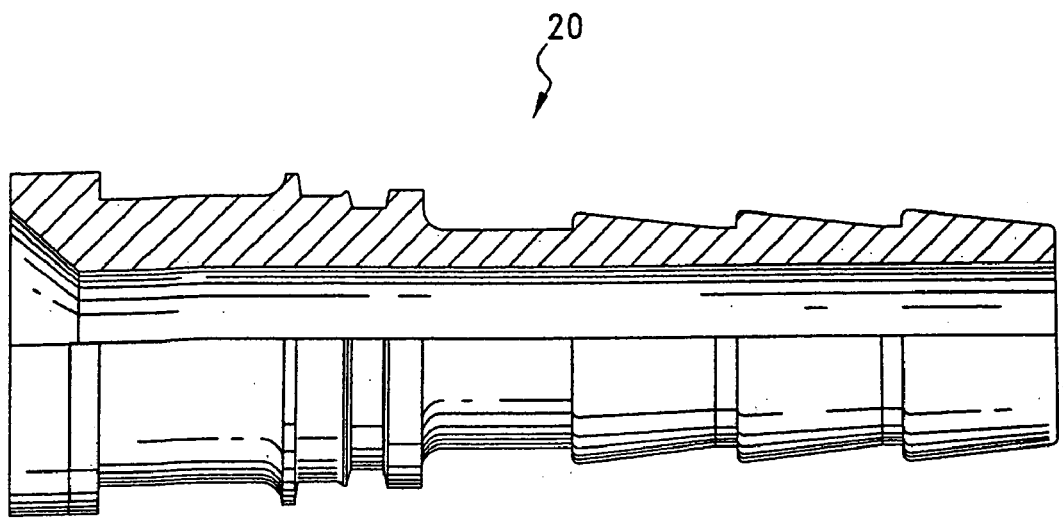
FIG. 6 is an elevational view of another embodiment of the fitting nipple, partially in section, in accordance with the present invention.
Figure 7:
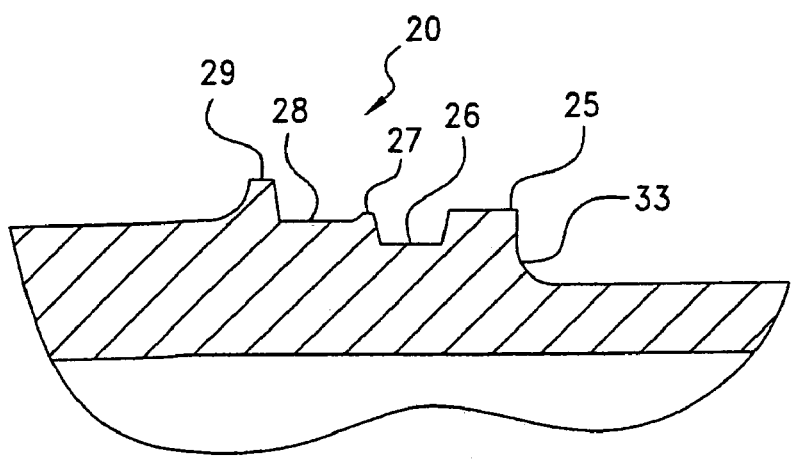
FIG. 7 is an enlarged view of the socket receiving area on the nipple shown in FIG. 6.

Referring to FIGS. 6–8, shell attachment areas 20 can be provided in nipples made from annealed tubing so that no hex profile is required on the nipple surface and therefore a shorter, more compact and lower cost nipple part can be produced. A hex is beneficial for certain style fittings, e.g., angled fittings, so that the installer can affix a wrench to the hex while connecting nut 60, e.g. to a mating port. A comparison of FIGS. 5 and 6 shows the elimination of hex 31 in FIG. 6. It should be noted that shell attachment area 20 shown in FIG. 6 defines a location for crimped shells on a cylindrical nipple without a hex, but the design can also include two or more precrimp grooves or steps 26, 28, 32 (as shown in FIG. 8 with hex 31) to accommodate multiple shell diameters and shell wall thicknesses.

Figure 21:
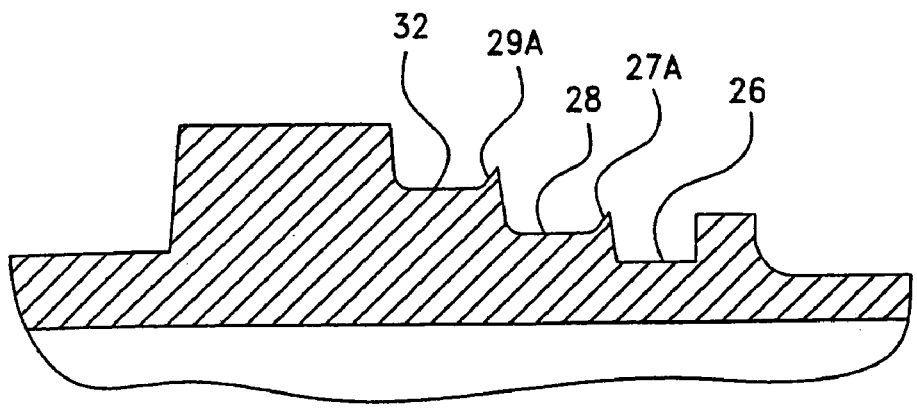
FIG. 21 is an enlarged view of a further embodiment of the socket receiving area on the nipple.
Figure 22:
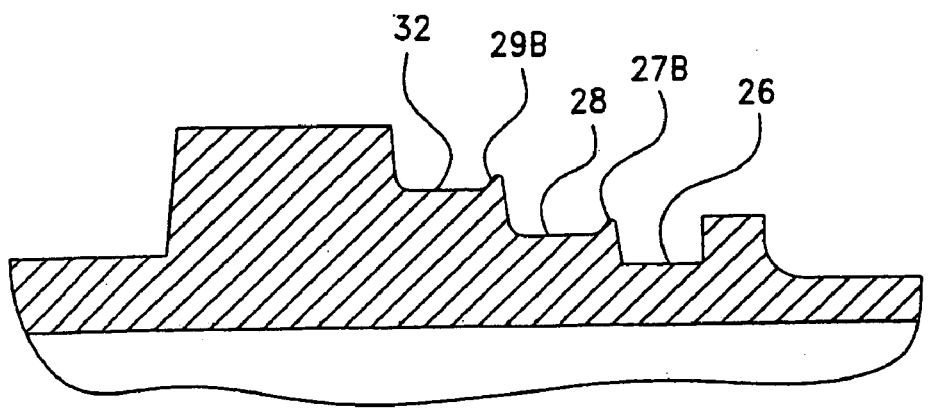
FIG. 22 is an enlarged view of a further embodiment of the socket receiving area on the nipple.

Ridge 27 locates shell 50 with respect to individual steps 26 and 28. Ridge 27 also provides longitudinal strength to support shells crimped down across both steps 26 and 28, as would be the case when a very thick walled shell, e.g., shell 41a and 41b (FIGS. 18, 19) is attached to nipple 10. Shell receiving ridges 29 and 27 can have a flat annular surface as depicted in FIG. 7. It should be noted that shell attachment area 20 could employ sharp, pointed ridges 27a and 29a, as shown in FIG. 21, if more impingement of the inner surface of the shell is needed. Further, rounded ridges 27b and 29b, as exhibited in FIG. 22, could also be used. Referring to FIG. 8, a three-step shell attachment area 20 for locating shells into steps 32, 28, or 26 is shown. This profile also has hex configuration 31. The multiple three step, e.g., shell attachment area 20 (FIG. 8) can locate shells individually at steps 32, 28, or 26, but can also locate thicker walled shells across a pair of steps, e.g. 32-28 (see FIGS. 9 and 9a), 28-26 or across all three lands 32-28-26 if necessary to improve the shell to nipple retention area for very high-pressure hose applications. Since the shell is attached at more than one land, it will have a greater resistance to axial separation from nipple 10.

Figure 10:
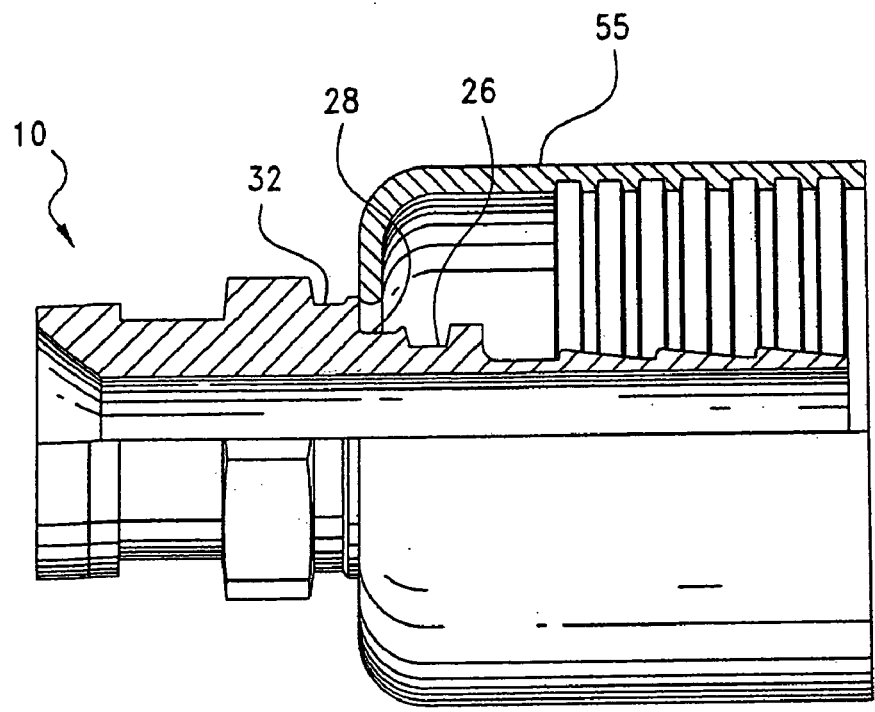
FIG. 10 is an elevational view of a fitting, partially in section, in accordance with one embodiment of the present invention with the shell permanently attached to one of the shell receiving steps of the nipple.
Figure 10A:
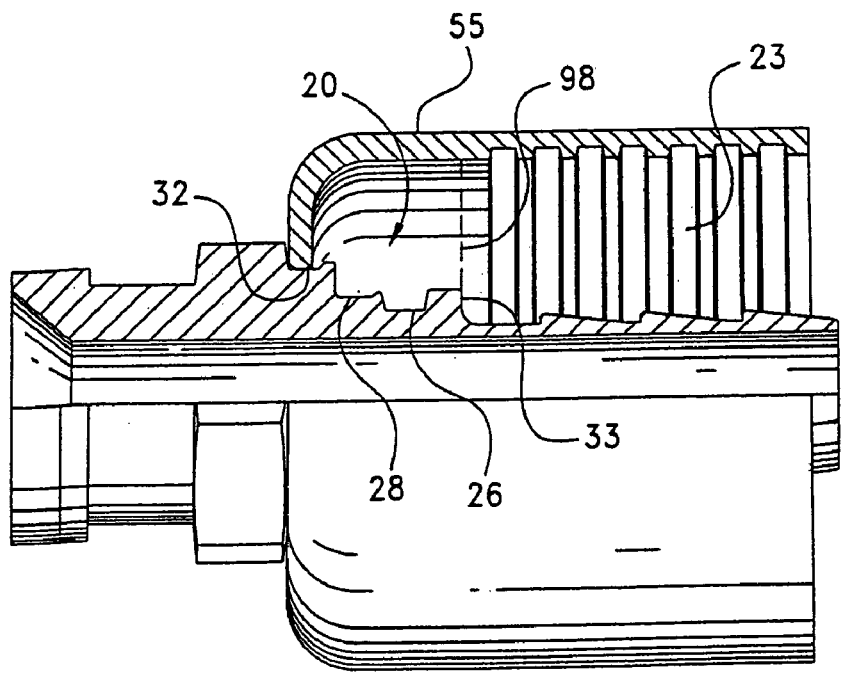
FIG. 10a is an elevational view of the fitting, partially in section, shown in FIG. 10 with the shell permanently attached to another one of the shell receiving steps of the nipple.

As shown in FIGS. 10 and 10a, the three-step shell attachment area 20 can accommodate a variety of shell widths or diameters that are needed for the varying thickness of hoses. For example, hoses having a half-inch inner diameter will have varying thicknesses depending on their intended working pressure. A hose for a low-pressure application needs only a thin wall thickness. A hose with a thin wall thickness will have a smaller outer diameter than one with a thicker wall. To accommodate the thin hose, the shell inner diameter will be approximately the same as the hose outer diameter. Therefore, the shell is attached to nipple 10 on shell receiving step 26 (not shown). If the hose is intended for a medium pressure use, the hose will have a medium wall thickness. In that case, the shell is attached to nipple 10 on shell receiving step 28, as is shown in FIG. 10. For high-pressure applications, the hose needs a thick wall. To accommodate a thick wall hose, the shell needs to have a greater radial displacement from nipple 10 than in the low-pressure and medium-pressure examples. Therefore, the shell is attached to nipple 10 on shell receiving step 32, as is shown in FIG. 10a. It should be noted again that for these varying pressures (and shells), nipple 10 remains the same, hence the designation "universal" nipple. For each sized hose, the end surface of the hose will abut an inside surface 33 (best shown in FIG. 7) of ridge 25. Stated another way, the conduit will enter space 23, between nipple 10 and shell 55, and stop at radial line 98. Ridge surface 33 is located on the side opposite step 26, of ridge 25.

Figure 11:
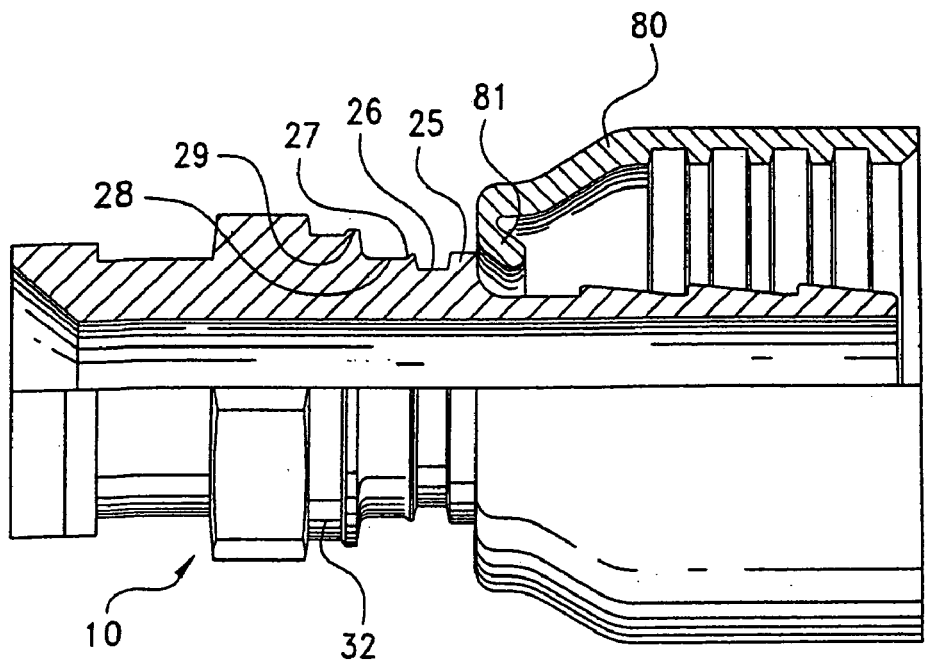
FIG. 11 is an elevational view of a fitting, partially in section, in accordance with a further embodiment of the present invention prior to the attachment of the socket onto the nipple.
Figure 11A:
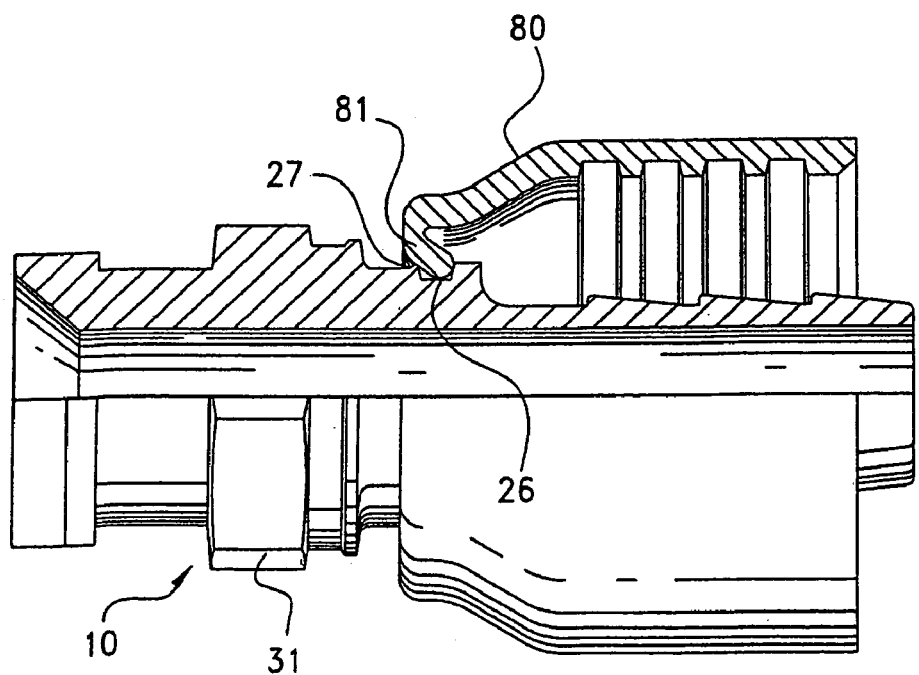
FIG. 11a is an elevational view of the fitting, partially in section, shown in FIG. 11 with the shell attached to the nipple.

Referring to FIGS. 11 and 11a, a further shell embodiment 80 is shown. Shell 80 has a radially turned-in end portion 81 which can be received within shell attachment area 20 (best shown in FIG. 8) in a different fashion from those described above. Shell 80 is affixed to universal nipple 10 at its turned-in end portion 81 without having to pre-crimp (or inwardly deform) the shell onto nipple 10. Contrasted with FIG. 3, in which a shell 75 is affixed onto nipple 10 at a pre-crimp location 76 prior to its attachment to a hose (not shown), shell 80 is placed around insertion end 14 of nipple 10 and is bumped into its permanent retained position shown in FIG. 11a by being interference-fitted over larger diameter shell receiving ridge 25. Turned-in end portion 81 is thus received in step 26 and is longitudinally retained in position between ridges 25 and 27. Ridge 27 impinges the outer surface of shell 80 (at turned-in end portion 81) while the distal end of shell 80 abuts ridge 27. The impingement of ridge 27 into shell 80 prevents the shell from rotating. If a shell with a larger inside diameter is needed, turned-in end portion 81 would be bumped into, and received by, step 28 while being longitudinally retained in position by ridges 27 and 29 (best seen in FIG. 8). If shell 80 has an even larger inside diameter, turned-in end portion 81 would be bumped into, and received by, step 32 while being longitudinally retained by ridge 29 and hex 31. It should be noted that the geometry of shell attachment area 20 is the same as that shown for receiving other style shells (for example in FIGS. 9 and 10) while shell 80 has a completely different profile and is affixed to nipple 10 in a non-crimped fashion.

Figure 12:
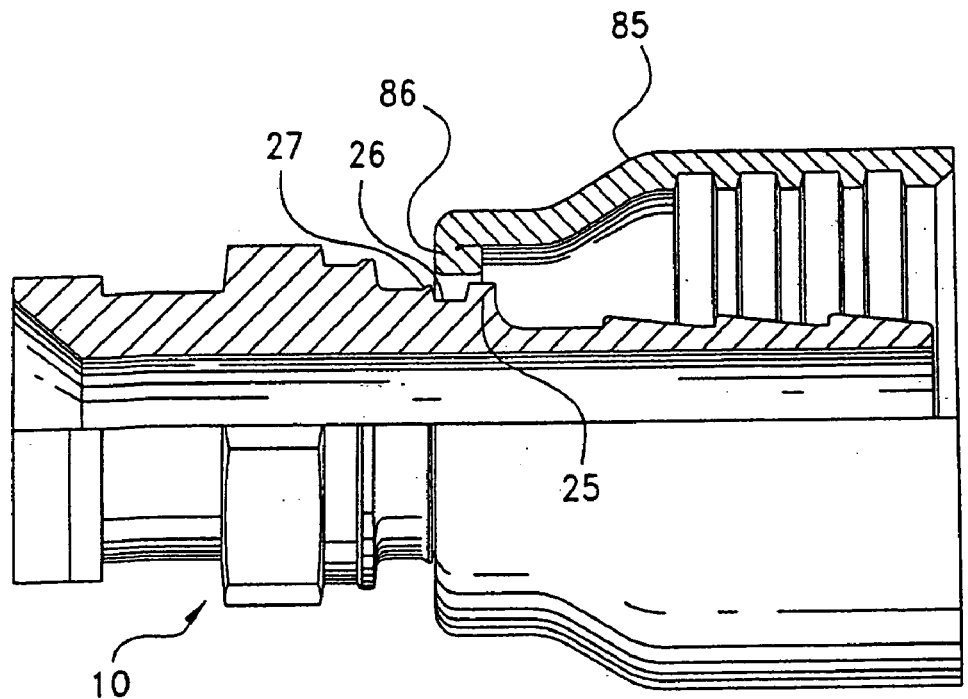
FIG. 12 is an elevational view of the fitting, partially in section, in accordance with another embodiment of the present invention prior to the permanent attachment of the socket onto the nipple.
Figure 12A:
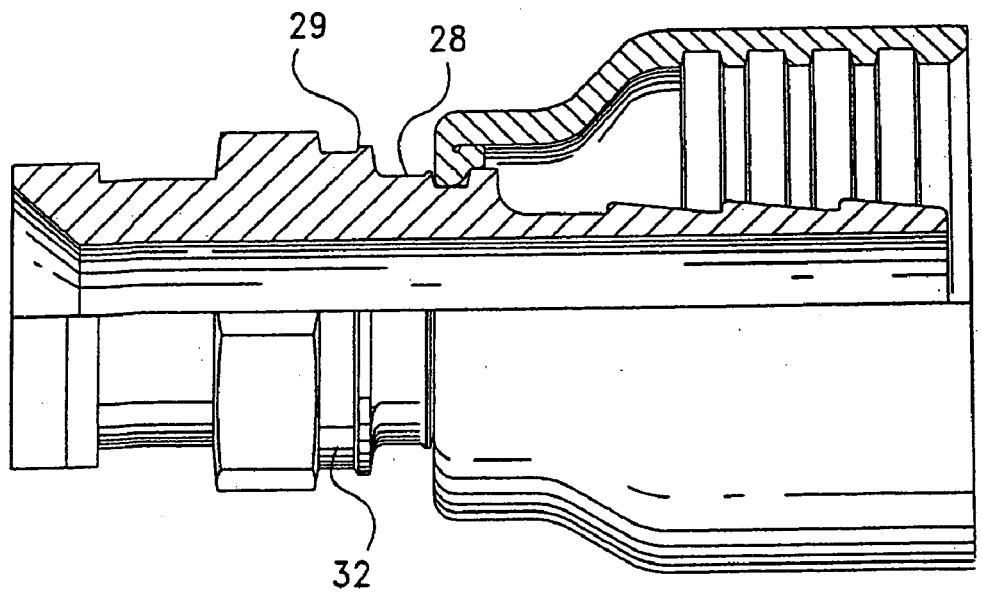
FIG. 12a is an elevational view of the fitting, partially in section, shown in FIG. 12 with the shell permanently attached to the nipple.

FIGS. 12 and 12a show another shell style 85 having a rolled over and radially inwardly-directed precrimp portion 86. The end of shell 85 is rolled over in order to fill step 26 between ridges 25 and 27 when shell 85 is pre-crimped onto nipple 10. Similar to that described above, shell 85 is crimped, or inwardly deformed, onto nipple 10 prior to connector's 5 attachment to the hose. As previously discussed, if a larger diameter is needed, shell 85 could be affixed to, and received by, steps 28 or 32. This style of shell 85, and method of attachment, ensures that a minimal amount of bottlenecking occurs during hose attachment process. If shell 85 is not located securely in steps 26, 28, or 32, portion 86 will move radially outward from the step when shell 85 is crimped, or moved inwardly, onto the hose.

Figure 9:
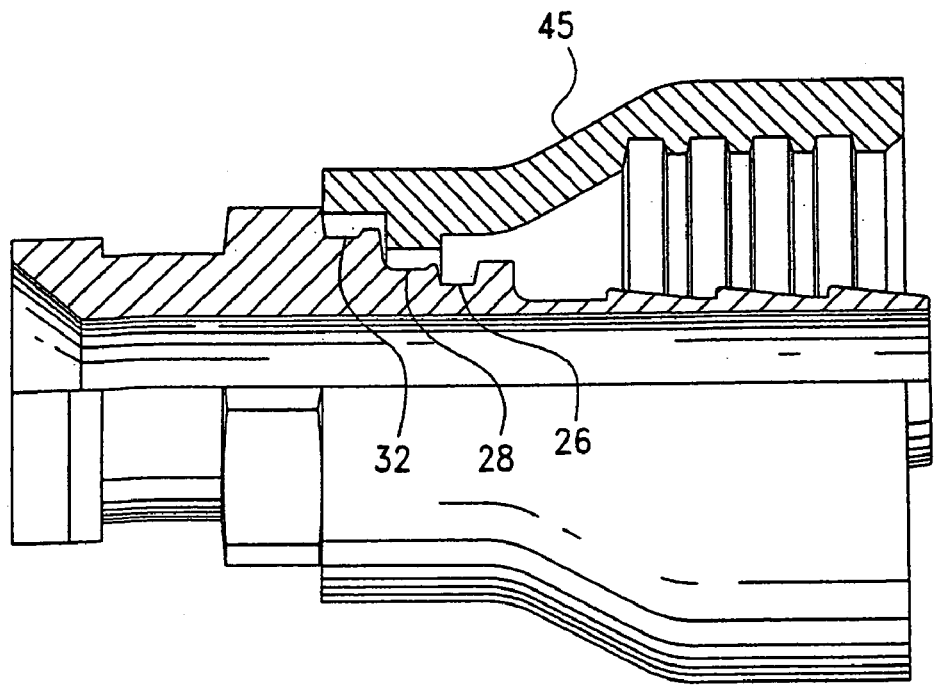
FIG. 9 is an elevational view of the fitting, partially in section, in accordance with the present invention prior to the attachment of the socket onto the nipple.
Figure 9A:
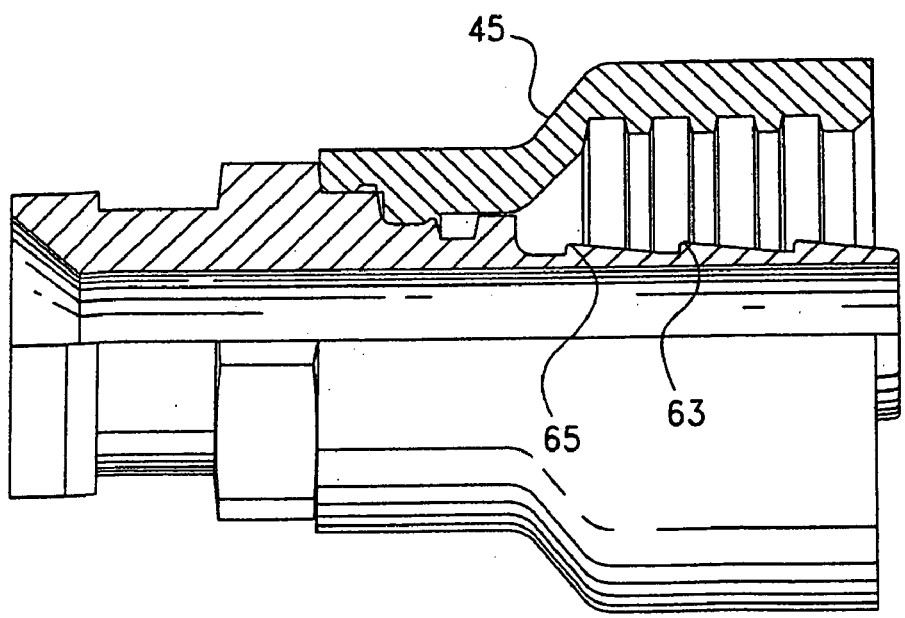
FIG. 9a is an elevational view of the fitting, partially in section, shown in FIG. 9 with the shell permanently attached to the nipple.

Referring now to FIG. 13, it shows one of many possible nipple outer surface profiles for insertion end 14. The longitudinal extents of each barb are equal. As described above, insertion end 14 has one barb 65 with a larger radial extent than barbs 63. Raised, or extended-diameter barb 65 allows assembly compatibility between hoses with slightly different bore sizes. Hoses with smaller bore diameters (thermoplastic and hybrid constructions) will have limited but manageable interference with barb 65 while larger bore sized rubber hoses have clearance over most of the nipple, but have at least limited interference with barb 65 for the purpose of keeping the fitting from falling off the hose during assembly and prior to the inward compression of the shell. Raised barb 65 allows the overall longitudinal length of nipple 10 to be decreased. With a thicker nipple 10, a thick shell (such as that shown in FIG. 9) can be used without negatively decreasing the size of nipple through bore 15. Without raised barb 65, nipple 10 would collapse when a hose is compressed between the thick shell and nipple 10. Since shell attachment area 20 is capable of longitudinally affixing a thick nipple (as shown in FIG. 9a), and nipple 10 will not collapse, a long nipple is not required. Without raised barb 65, nipple 10 would have an increased length together with increased material and manufacturing costs.

Although single raised barb 65 can be located at any of the barb locations along the nipple profile, it is preferred to have raised barb 65 furthest away from the hose end of nipple 10 to minimize fitting insertion force during fitting assembly onto the hose. It is also preferred to have raised barb 65 positioned near the mid-length of nipple 10 (see FIG. 1) to resist the collapse of nipple 10 by the compression of the hose and shell against nipple 10 when connector 5 is crimped onto the hose. It is well known in the art that nipple 10 will tend to collapse or neck-down into an "hourglass" type profile at a location approximately mid-length along nipple 10. By positioning raised barb 65 at the mid-length point on nipple 10, it provides a greater resistance to the collapse of nipple 10 due to its greater wall thickness.

Figure 14:
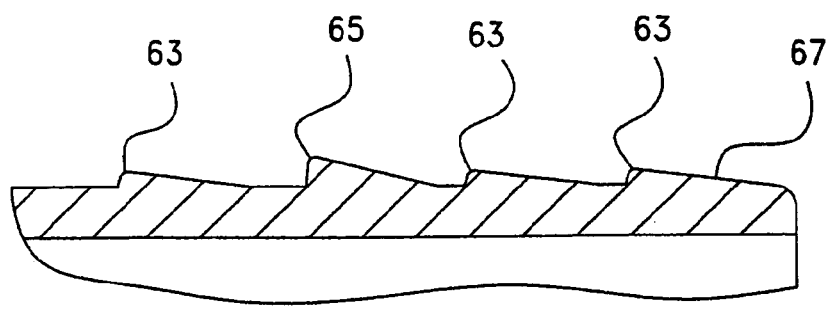
FIG. 14 is an enlarged breakout view of a barb arrangement for another embodiment of the nipple according to the present invention.

Referring to FIG. 14, a further version of nipple outer surface 14 is shown where 4 barbs are used. In this embodiment raised barb 65 is positioned between two adjacent barbs 63. This embodiment is a compromise between having as few barbs as possible on nipple 10 to provide adequate hose retention but also to minimize the overall connector length. As in the three-barb profile, the longitudinal extent of each barb 63, 65 is preferably equal.

Figure 15:
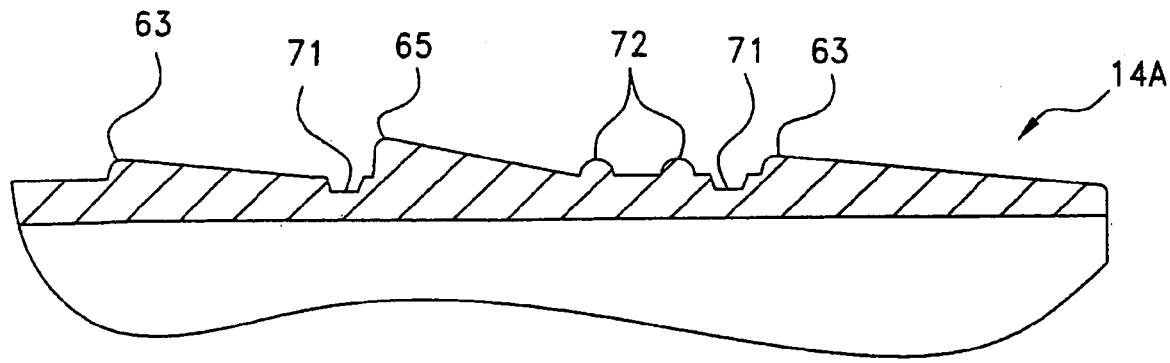
FIG. 15 is an enlarged breakout view of a nipple's outer surface for a further embodiment of the present invention.

FIG. 15 provides an illustration of a further embodiment nipple outer surface profile 14a. In addition to barbs 63, 65, nipple outer surface profile 14a also uses combinations, repetitive patterns of or random groupings of formed grooves 71 and raised ridges or beads 72. When used in different combinations, grooves 71 provide improved sealing and retention of thermoplastic tubes found in thermoplastic and hybrid hose constructions, while beads 72 offer improved sealing against very soft thermoplastic and thermoset rubber tube compounds. The spacing and geometry of these features can vary with the intended hose construction, but most commonly include barbs 63, 65 with an equal longitudinal extent.

Another embodiment of nipple outer surface that can be used in this invention is shown, and hereby incorporated by reference, in U.S. Pat. No. 5,382,059 to Wilson, also owned by the assignee of the present invention. In this design, the nipple outer surface has circumferential scallops designed to accommodate both rubber, thermoplastic and hybrid hose constructions.

Nipple 10 can connect with both one piece and two-piece shell designs. The one piece fitting shell can be locked onto nipple 10 by "precrimping" the compression shell onto at least one of the shell receiving steps of nipple 10. Referring to FIGS. 16 and 17, in the alternative, nipple 10 can be matched up with machined shell 35 and located onto a hose (not shown) for a single crimp operation assembly. This single crimp assembly compresses shell 35 with the hose while simultaneously locating shell inwardly directed portion 36 onto nipple receiving step 26.

Figure 20:
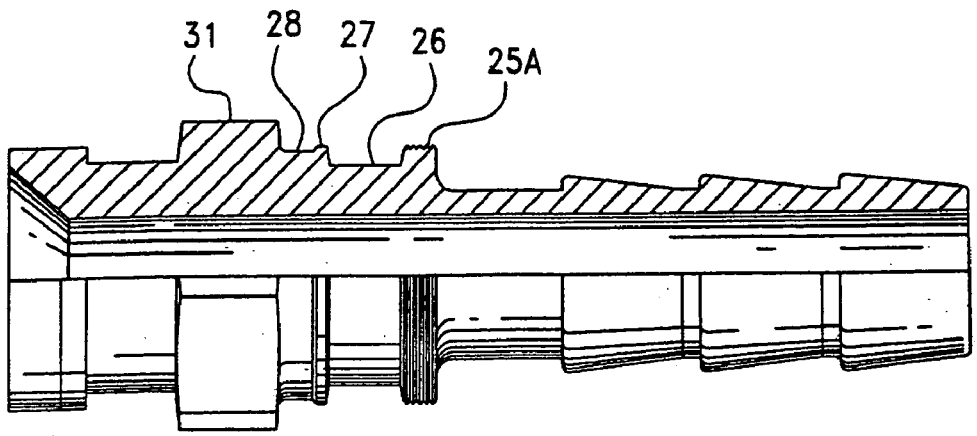
FIG. 20 is an elevational view, partially in section, of a further embodiment of the fitting nipple according to the present invention.

Another embodiment of nipple 10 is shown in FIG. 20. This embodiment has a threaded shell receiving ridge 25a for attachment with a shell (not shown). As is well known in the art, certain connector combinations (shell and nipple) are threadedly connected with each other. The shell, with internal threads, is screwed onto receiving ridge 25a of nipple 10 in order to correctly position the shell relative to nipple 10. The hose is inserted between nipple 10 and the shell and the shell in inwardly crimped for better attachment of the shell onto nipple 10 and for permanent attachment with the hose. This style of nipple 10 is particularly useful for shells comprised of a brittle material that can crack when pre-crimped onto nipple 10.

It should be noted that the present invention is not limited to the specified preferred embodiments and principles. Those skilled in the art to which this invention pertains may formulate modifications and alterations to the present invention. These changes which rely upon the teachings by which this disclosure has advanced are properly considered within the scope of this invention as defined by the appended claims.

What is claimed is:

1. A permanently attached hose coupling, for a pressurized conduit end, having a generally tubular nipple and a generally cylindrical shell permanently attached to said nipple and generally surrounding said conduit end, said nipple having a longitudinal axis, a first end, a second end, a plurality of circumferential grooves located between said first and said second ends, a bore extending from said first end to said second end, and an insert portion adjacent said plurality of grooves inserted into said conduit end;
    wherein said grooves are dimensioned for affixedly receiving at least one of an inside surface, an end surface and an outside surface of said generally cylindrical shell; and
    said grooves comprising:
    a first groove with a generally flat base portion parallel with said longitudinal axis, a first substantially vertically oriented side wall, and a second substantially vertically oriented side wall having a maximum radial extent less than said first side wall; a second groove adjacent said first groove, with a generally flat base portion parallel with said longitudinal axis having a diameter less than said first groove base portion, a first substantially vertically oriented side wall having a maximum radial extent similar to said first groove second side wall, and a second substantially vertically oriented side wall having a maximum radial extent less than said second groove first side wall; and
    a third groove adjacent said second groove, with a generally flat base portion parallel with said longitudinal axis having a diameter less than said second groove base portion, a first substantially vertically oriented side wall having a maximum radial extent similar to said second groove second side wall and a second substantially vertically oriented side wall having a maximum radial extent greater than said third groove first side wall.

2. The hose coupling as in claim 1 wherein said first groove second side wall and said second groove second side wall have a contoured top portion.

3. The hose coupling as in claim 1 wherein said first groove second side wall and said second groove second side wall have an angled top portion.

4. The hose coupling as in claim 1 wherein said insert portion has a plurality of spaced, circumferentially extending, frusto-conically shaped protrusions on the outer surface thereof.

5. The hose coupling as in claim 4 wherein one of said plurality of spaced protrusions is positioned approximately equidistant between said third groove and said second end and has a maximum radial extent greater than that of each of the others of said plurality of protrusions.

6. The hose coupling as in claim 1 wherein said generally flat base portion of each of said plurality of circumferential grooves has a series of surface disruptions along its circumference.

7. The hose coupling as in claim 1 wherein the outer surface of said third groove second substantially vertically oriented side wall has threads for attachment with said generally cylindrical shell.

8. A permanently attached hose coupling, for a pressurized conduit end, having a generally tubular nipple and a generally cylindrical shell permanently attached to said nipple and generally surrounding said conduit end, said nipple having a longitudinal axis, a first end, a second end, a plurality of circumferential grooves located between said first and said second ends, a bore extending from said first end to said second end, and an insert portion adjacent said plurality of grooves inserted into said conduit end;
    wherein said grooves are dimensioned for affixedly receiving at least one of an inside surface, an end surface and an outside surface of said generally cylindrical shell; and
    said grooves comprising:
    a first groove with a generally flat base portion parallel with said longitudinal axis, a first substantially vertically oriented side wall, and a second substantially vertically oriented side wall having a maximum radial extent less than said first side wall; and
    second groove adjacent said first groove, with a generally flat base portion parallel with said longitudinal axis having a diameter less than said first groove base portion, a first substantially vertically oriented side wall having a maximum radial extent similar to said first groove second side wall, and a second substantially vertically oriented side wall having a maximum radial extent greater than said second groove first side wall.

9. The hose coupling as in claim 8 wherein said insert portion has a plurality of spaced, circumferentially extending, frusto-conically shaped protrusions on the outer surface thereof.

10. The hose coupling as in claim 9 wherein one of said plurality of spaced protrusions is positioned approximately equidistant between said second groove and said second end and has a maximum radial extent greater than that of each of the others of said plurality of protrusions.

11. The hose coupling as in claim 8 wherein said generally cylindrical shell has a first end with an inwardly directed portion having an annular surface in an abutting relationship with one of said plurality of circumferential grooves for said permanent attachment.

12. The hose coupling as in claim 11 wherein said inwardly directed portion is located at the longitudinal inner end of said generally cylindrical shell.

13. The hose coupling as in claim 11 wherein said inwardly directed portion is located on the inside surface of said generally cylindrical shell.

14. The hose coupling as in claim 8 wherein said generally cylindrical shell has a first end and a second end, said first end having a turned-in portion generally directed towards said second end.

15. The hose coupling as in claim 14 wherein the outer surface of said turned-in portion is in affixed abutment with said second groove first side wall.

16. The hose coupling as in claim 8 wherein the inside surface of said generally cylindrical shell affixedly abuts said first and said second side walls of said second groove.

17. A generally tubular nipple having a longitudinal axis, a first end, a second end, an outer surface with a plurality of circumferential grooves, located between said first and said second ends, for affixedly receiving a generally cylindrical shell, and a bore extending from said first end to said second end;
   wherein said plurality of circumferential grooves are dimensioned for affixedly receiving at least one of an inside surface, an end surface and an outside surface of said generally cylindrical shell; and
   said plurality of grooves comprising:
   a first groove with a generally flat base portion parallel with said longitudinal axis, a first generally vertically oriented side wall, and a second generally vertically oriented side wall having a maximum radial extent less than said first side wall;
   a second groove adjacent said first groove, with a generally flat base portion parallel with said longitudinal axis having a diameter less than said first groove base portion, a first generally vertically oriented side wall having a maximum radial extent substantially equal to said first groove second side wall, and a second generally vertically oriented side wall having a maximum radial extent less than said second groove first side wall; and
   a third groove adjacent said second groove, with a generally flat base portion parallel with said longitudinal axis having a diameter less than said second groove base portion, a first generally vertically oriented side wall having a maximum radial extent substantially equal to said second groove second side wall and a second generally vertically oriented side wall having a maximum radial extent greater than said third groove first side wall.

18. The generally tubular nipple as in claim 17 further including an insert portion located between said third groove and said second end and has a plurality of spaced, circumferentially extending, frusto-conically shaped protrusions on the outer surface thereof.

19. The generally tubular nipple as in claim 17 wherein one of said plurality of spaced protrusions is positioned approximately equidistant between said third groove and said second end and has a maximum radial extent greater than that of each of the others of said plurality of protrusions.

20. The generally tubular nipple as in claim 17 wherein said generally flat base portion of each of said plurality of circumferential grooves has a series of surface disruptions along its circumference.

21. The generally tubular nipple as in claim 17 wherein the outer surface of said third groove second substantially vertically oriented side wall has threads for attachment with said generally cylindrical shell.

22. A generally tubular nipple having a longitudinal axis, a first end, a second end, an outer surface with at least two circumferential grooves located between said first and said second ends for affixedly receiving a generally cylindrical shell, and a bore extending from said first end to said second end;
   wherein said at least two circumferential grooves are dimensioned for affixedly receiving at least one of an inside surface, an end surface and an outside surface of said generally cylindrical shell; and
   said at least two circumferential grooves comprising:
   a first groove with a generally flat base portion parallel with said longitudinal axis, a first generally vertically oriented side wall, and a second generally vertically oriented side wall having a maximum radial extent less than said first side wall; and
   second groove adjacent said first groove, with a generally flat base portion parallel with said longitudinal axis having a diameter less than said first groove base portion, a first generally oriented side wall having a maximum radial extent generally equal to said first groove second side wall, and a second generally vertically oriented side wall having a maximum radial extent greater than said second groove first side wall.

23. The generally tubular nipple as in claim 22 further including an insert portion located between said second groove and said second end and has a plurality of spaced, circumferentially extending, frusto-conically shaped protrusions on the outer surface thereof.

24. The generally tubular nipple as in claim 23 wherein one of said plurality of spaced protrusions is positioned approximately equidistant between said second groove and said second end and has a maximum radial extent greater than that of each of the others of said plurality of protrusions.

25. The generally tubular nipple as in claim 22 wherein said generally flat base portion of each of said at least two circumferential grooves has a series of surface disruptions along its circumference.

26. The generally tubular nipple as in claim 22 wherein the outer surface of said second groove second substantially vertically oriented side wall has threads for attachment with said generally cylindrical shell.

27. A generally tubular nipple having a longitudinal axis, a first end, a second end, an outer surface with a series of circumferential grooves located between said first and second ends for affixedly receiving a generally cylindrical shell, and a bore extending from said first end to said second end;
   wherein said series of circumferential grooves are dimensioned for affixedly receiving at least one of an inside surface, an end surface and an outside surface of said generally cylindrical shell; and
   said series of grooves comprising:
   a first groove with a generally flat base portion parallel with said longitudinal axis, a first substantially radially directed sidewall, and a second substantially radially directed sidewall;
   a second groove adjacent said first groove, with a generally flat base portion parallel with said longitudinal axis having a diameter less than said first groove base portion, a first substantially radially directed sidewall, having a maximum radial extent generally equal to said first groove second sidewall, and a second substantially radially directed sidewall; and
   a third groove adjacent said second groove, with a generally flat base portion parallel with said longitudinal axis having a diameter less than said second groove base portion, a first substantially radially directed sidewall, having a maximum radial extent generally equal to said second groove second sidewall, and a second substantially radially directed sidewall having an outer surface with a series of threads for attachment with said generally cylindrical shell.

* * * * *